United States Patent
Yamakawa et al.

[11] Patent Number: 6,109,870
[45] Date of Patent: Aug. 29, 2000

[54] ROTOR BLADE FLAP DRIVING APPARATUS

[75] Inventors: Eiichi Yamakawa; Tatsuro Hongu; Mitsumasa Sato; Shun-ichi Bandoh, all of Kakamigahara, Japan

[73] Assignee: Advanced Technology Institute of Commuter-Helicopter, Ltd., Kakamigahara, Japan

[21] Appl. No.: 09/239,799

[22] Filed: Jan. 29, 1999

[30] Foreign Application Priority Data

Mar. 24, 1998 [JP] Japan .................................. 10-076242

[51] Int. Cl.$^7$ ...................................................... B64C 11/28
[52] U.S. Cl. ............................ 416/23; 244/75 R; 244/78; 244/17.25
[58] Field of Search .............................. 415/119; 416/23, 416/24, 155, 156, 158, 500; 244/17.25, 17.27, 215, 75 R, 78; 60/533

[56] References Cited

U.S. PATENT DOCUMENTS 3,940,937   3/1976   Yamakawa et al. ...................... 416/23
5,639,215   6/1997   Yamakawa et al. ...................... 416/23

Primary Examiner—Edward K. Look
Assistant Examiner—James M. McAleenan
Attorney, Agent, or Firm—Wenderoth, Lind & Ponack, L.L.P.

[57] ABSTRACT

A flap is attached to a rear end of a blade so as to be angularly displaceable. Displacement magnifying means magnifies the amount of displacement from an actuator to drive the flap. An input portion to which the displacement is applied from the actuator is expandably and contractibly supported by bellows. Likewise, an output portion to which the input amount of displacement is magnified is expandably and contractibly supported by a bellows. Consequently, displacement magnifying means is realized in which, compared with a existing piston with O ring which slides on the cylinder inner wall, no deterioration in response characteristic due to high friction occurs when the actuator is displaced at high speed, and no fluid leakage due to deterioration or wear of the O ring occurs. According to this structure, a rotor blade flap driving apparatus is obtained which has displacement magnifying means with fast response and no fluid leakage.

16 Claims, 16 Drawing Sheets

ROTOR BLADE FLAP DRIVING APPARATUS

FIELD OF THE INVENTION

The present invention relates to a rotor blade flap driving apparatus for driving a flap provided at a rear edge of each rotor blade of helicopters and the like.

DESCRIPTION OF THE RELATED ART

In recent years, there have been increasing demands for commuter helicopters which take off and land at heliports in urban areas. To realize this, noise reduction is required. As an anti-noise measure, a method has been considered in which a flap is attached to each rotor blade of a helicopter and the flap is driven at a high speed of approximately 30 Hz to 50 Hz and finely controlled to thereby improve aerodynamic characteristics of the rotor blades.

FIG. 24 is a plan view showing a existing rotor blade flap driving apparatus 1. FIG. 25 is a side view of the driving apparatus 1. To a rear edge of a blade is attached a flap 3 so as to be angularly displaceable about a hinge shaft 13 extending in a direction of a span of the blade 2.

As an actuator 4 for generating a driving force of the flap 3 is used a small-size, lightweight and fast-response actuator such as a stack-type piezo-actuator in which thin plates of piezoceramics are stacked. Since an amount of displacement of such a stack-type piezo-actuator is small, the amount of displacement is magnified by displacement magnifying means 8 to drive the flap 3. The displacement magnifying means 8 has a master cylinder 5 and a slave cylinder 6. When the actuator 4 expands, hydraulic fluid pushed out by the master cylinder 5 flows into the slave cylinder 6 through a line 9. Since the output side pressure surface of a slave piston 11 is smaller in pressure receiving area than the input side pressure surface of a master piston 10, the displacement of the actuator 4 is magnified in accordance with the ratio between the pressure receiving areas to displace the slave piston 11, so that the flap 3 coupled to the slave piston 11 through a flap driving rod 7 is angularly displaced.

O rings are inserted between the master cylinder 5 and the master piston 10 and between the slave cylinder 6 and the slave piston 11, respectively, to prevent the hydraulic fluid from leaking from between the cylinders 5 and 6 and the pistons 10 and 11 which slide on each other.

As the actuator for the flap driving apparatus, a stack-type piezo-actuator as mentioned above or a giant magnetostrictive actuator is used. These actuators are necessarily provided with a preload by being compressed in the displacement direction in order to increase fatigue life. Therefore, in the rotor blade flap driving apparatus 1, a preload spring 12 is disposed between the flap 3 and the blade 2 so that the slave piston 11 is pushed into the slave cylinder 6. The hydraulic fluid pushed out by the slave piston 11 by the force of the spring 12 acts on the master piston 10, so that the actuator 4 is provided with a preload. There are cases where a coned disk spring is separately provided and the actuator is provided with a preload directly by the spring.

Since the master piston 10 and the slave piston 11 are slidably displaced at high speed as mentioned above, fluid leakage is liable to occur due to frictional wear of the O ring, and high speed response characteristic may deteriorates due to too large frictional force of the O ring.

Moreover, it is possible to use displacement magnifying means that magnifies the amount of displacement of the actuator mechanically with the use of an L-shaped lever instead of using such hydraulic pressure. The L-shaped lever has an input arm having a short arm length, an output arm having a long arm length and a bearing for supporting the L-shaped lever so as to be angularly displaceable about an angular displacement axis. The L-shaped lever magnifies the amount of displacement of the actuator in accordance with the ratio between the arm lengths.

It is necessary for the displacement magnifying means to prevent reduction in magnification ratio by eliminating deformations of the arms and backlash at the support portion. Moreover, in order to mount the displacement magnifying means in the rotor blade structure, it is necessary for the means to be as small in size as possible. That is, it is desirable to increase the magnification ratio with a small size by reducing the length of the input arm without increasing the length of the output arm. However, reduction in length of the input arm reduces the size of the support bearing of the L-shaped lever, so that it is difficult to support the L-shaped lever with stability due to reduction in strength and rigidity and increase in backlash at the support portion.

When a stack-type piezo-actuator is used as the actuator, since it is necessary to use a spring for providing a preload, the number of parts increases, so that the structure is complicated.

SUMMARY OF THE INVENTION

An object of the invention is to provide a rotor blade flap driving apparatus having displacement magnifying means maintaining fast response without the hydraulic fluid such as oil leakage.

Another object of the invention is to provide a rotor blade flap driving apparatus having mechanical displacement magnifying means supported with stability without the magnification ratio being reduced and without the size being increased.

The invention is a rotor blade flap driving apparatus comprising:

a flap angularly displaceably attached to a rear edge of a blade;

an actuator for generating a driving force of the flap; and displacement magnifying means interposed between the actuator and the flap, for magnifying an amount of displacement of the actuator, wherein the displacement magnifying means comprises:
a vessel filled with a hydraulic fluid;
an input portion to which a displacement from the actuator is transmitted, having an input side pressure surface facing the hydraulic fluid;
a first expandable and contractible member for displaceably supporting the input portion and sealing a gap between the input portion and the vessel;
an output portion having an output side pressure surface which faces the hydraulic fluid and have a smaller pressure receiving area than that of the input side pressure surface, the output portion being coupled to the flap; and
a second expandable and contractible member for displaceably supporting the output portion and sealing a gap between the output portion and the vessel.

According to the invention, the amount of displacement of the actuator is magnified by the displacement magnifying means to drive the flap attached to the rear edge of the blade. Since the output side pressure surface of the output portion coupled to the flap is smaller in pressure receiving area than the input side pressure surface of the input portion to which the displacement from the actuator is transmitted, the amount of displacement of the actuator is magnified in accordance with the ratio between the areas. The first and second expandable and contractible members for displaceably supporting the input and output portions can permit the input and output portions to be displaced by expanding and contracting. Since the expandable and contractible members expand and contract to seal the gaps between the input and output portions and the vessel, no sliding portion is provided, so that deterioration of response due to friction at the sliding portion and leakage of the hydraulic fluid due to wear of the sliding portion are surely prevented. As a result, the output portion can drive the flap properly.

In the invention it is preferable that the vessel filled with the hydraulic fluid comprises:

an input housing having the input portion to which the displacement from the actuator is transmitted;

an output housing disposed in the proximity of the flap, having the output portion; and a line connected to the input housing to the output housing filled with a hydraulic fluid.

According to the invention, the vessel filled with the hydraulic fluid is separated into the input and output housings which are coupled by the line. Since the output housing having the output portion is disposed in the proximity of the flap, an output rod or the like for coupling the output portion and the flap can be short in size, so that displacement of the output portion can be effectively transmitted to the flap.

In the invention it is preferable that the displacement magnifying means is formed into a unit structure in which the input and output portions are disposed close to each other.

According to the invention, since the input and output portions are disposed close to each other, the vessel filled with the hydraulic fluid can be integrally formed, so that the displacement magnifying means is structured as a unit. Consequently, the displacement magnifying means can be structured so as to be small in size and light in weight. In addition, fluid leakage can be prevented.

In the invention it is preferable that a plurality of input portions each having the input side pressure surface are disposed in parallel in a direction of a chord of the rotor blade.

According to the invention, since a plurality of input portions each having the input side pressure surface are provided, the displacement of the actuator can be caused to effectively act on the hydraulic fluid compared with the structure in which one large input portion having the same pressure receiving area is provided.

The invention provides a rotor blade flap driving apparatus comprising:

a flap attached to a rear edge of a blade so as to be angularly displaceable;

an actuator for generating a driving force of the flap; and displacement magnifying means interposed between the actuator and the flap, for magnifying an amount of displacement of the actuator, wherein the displacement magnifying means comprises:

an input portion having an axis which is decentered from a predetermined angular displacement axis by a predetermined input arm length, the actuator being coupled to the input portion so as to intersect the decentered axis perpendicularly thereto;

an output portion to which the flap is coupled with an output arm having a length larger than the input arm length with respect to the angular displacement axis; and a support portion for supporting the input and output portions so as to be angularly displaced about the angular displacement axis integrally, the support portion being coupled to the input and output portions at predetermined distances therefrom in a direction of the angular displacement axis.

According to the invention, the amount of displacement of the actuator is magnified by the displacement magnifying means to drive the flap attached to the rear edge of the blade. The displacement magnifying means has the input portion to which the actuator is coupled and the output portion to which the flap is coupled. The input and output portions are angularly displaced about the angular displacement axis integrally to thereby magnify the amount of displacement of the actuator at an magnification ratio in accordance with the ratio between the input and output arm lengths.

Since the input and output portions and the support portion for supporting the input and output portions are coupled at predetermined distances therebetween in the direction of the angular displacement axis, even when the input arm length is small, it never occurs that there is no space for disposing the support portion such as a bearing, so that the input and output portions can be supported with stability. As a result, the displacement magnifying means has high rigidity and high precision and a high magnification ratio can be maintained without the structure of the displacement magnifying means being increased.

In the invention it is preferable that the displacement magnifying means comprises the input portion, the output portion and the support portion sharing the angular displacement axis and an input shaft of the input portion, an output shaft of the output portion and a support shaft of the support portion are formed as an integral unit.

According to the invention, the input and output portions and support portion of the displacement magnifying means have the common angular displacement axis, and have the corresponding input, output and support shafts. Since these shafts are formed as an integral unit, the shafts have high precision and high rigidity, so that displacement magnifying means with high durability can be realized.

In the invention it is preferable that the rotor blade flap driving apparatus further comprising between the output portion of the displacement magnifying means and an angular displacement shaft of the flap:

an output rod attached to the output portion; and second displacement magnifying means fixed to the angular displacement shaft of the flap, having an axis decentered from an angular displacement axis of the flap by a predetermined input arm length, the output rod being coupled to the second displacement magnifying means so as to intersect at right angles to the decentered axis.

According to the invention, the second displacement magnifying means is provided in addition to the first displacement magnifying means for more efficient magnification of displacement. The second displacement magnifying means is fixed to the angular displacement shaft of the flap and magnifies the input displacement from the first displacement magnifying means to drive the flap. Thus, by providing the first and the second displacement magnifying means, the flap can be largely driven even when the displacement of the actuator is very small.

In the invention it is preferable that the second displacement magnifying means comprises:

an input shaft integrally fixed to the angular displacement shaft of the flap, having a decentered axis situated close to the angular displacement axis of the flap;

a rod end coupled to the output rod, for supporting the input shaft so as to be angularly displaceable about the axis of the input shaft; and a support member situated close to the rod end, having a bearing for supporting the angular displacement shaft of the flap.

According to the invention, the input shaft of the second displacement magnifying means has the decentered axis situated close to the angular displacement axis of the flap, and to the input shaft, the displacement output from the first displacement magnifying means is applied through the rod end. Thus, the input shaft has the decentered axis situated close to the angular displacement axis of the flap and the distance between the angular displacement axis of the flap and the decentered axis is the input arm length. Consequently, the input arm length can be reduced, no parts protrude from the blade, and increase of aerodynamic drag and deterioration in aerodynamic characteristics of the blade can be prevented. Moreover, since the input arm length can be reduced, the magnification ratio of the second displacement magnifying means can be increased.

In the invention it is preferable that a plurality of actuators are disposed in parallel in a direction of a chord of the rotor blade.

According to the invention, by providing a plurality of actuators, a large driving force can be generated.

In the invention it is preferable that the actuator is composed of a stack-type piezo-actuator in which a plurality of piezo elements are stacked which elements are displaced in accordance with an applied voltage, and the actuator is disposed so as to be displaced along a span of the blade, and one end of the actuator on the outer side of the blade is fixed to the blade.

According to the invention, since the actuator is composed of a stack-type piezo-actuator, it is necessary to provide the actuator with a preload by compressing the actuator in the displacement direction in order to increase fatigue life. However, since the actuator is disposed along the span of the blade and one end of the actuator on the outer side of the blade is fixed to the blade, the rotation of the rotor blade provides the actuator with a preload by the centrifugal force. Consequently, it is unnecessary to provide a preload by a spring or the like in the case of the existing design, so that the number of parts is reduced to simplify the structure.

In the invention it is preferable that the actuator is composed of a giant magnetostrictive actuator displaced by a change in magnetic field caused by passing current through an electromagnetic coil, and the actuator is disposed so as to be displaced along a span of the blade, and one end of the actuator on the outer side of the blade is fixed to the blade.

According to the invention, although the actuator is composed of a giant magnetostrictive actuator necessarily provided with a preload in order to increase fatigue life. Since the actuator is disposed in the direction of the span and one end of the actuator on the outer side of the blade is fixed to the blade, the rotation of the rotor blade provides the actuator with a preload by the centrifugal force. Consequently, it is unnecessary to provide a preload by a spring or the like in the case of the existing design, so that the number of parts is reduced to simplify the structure.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1:
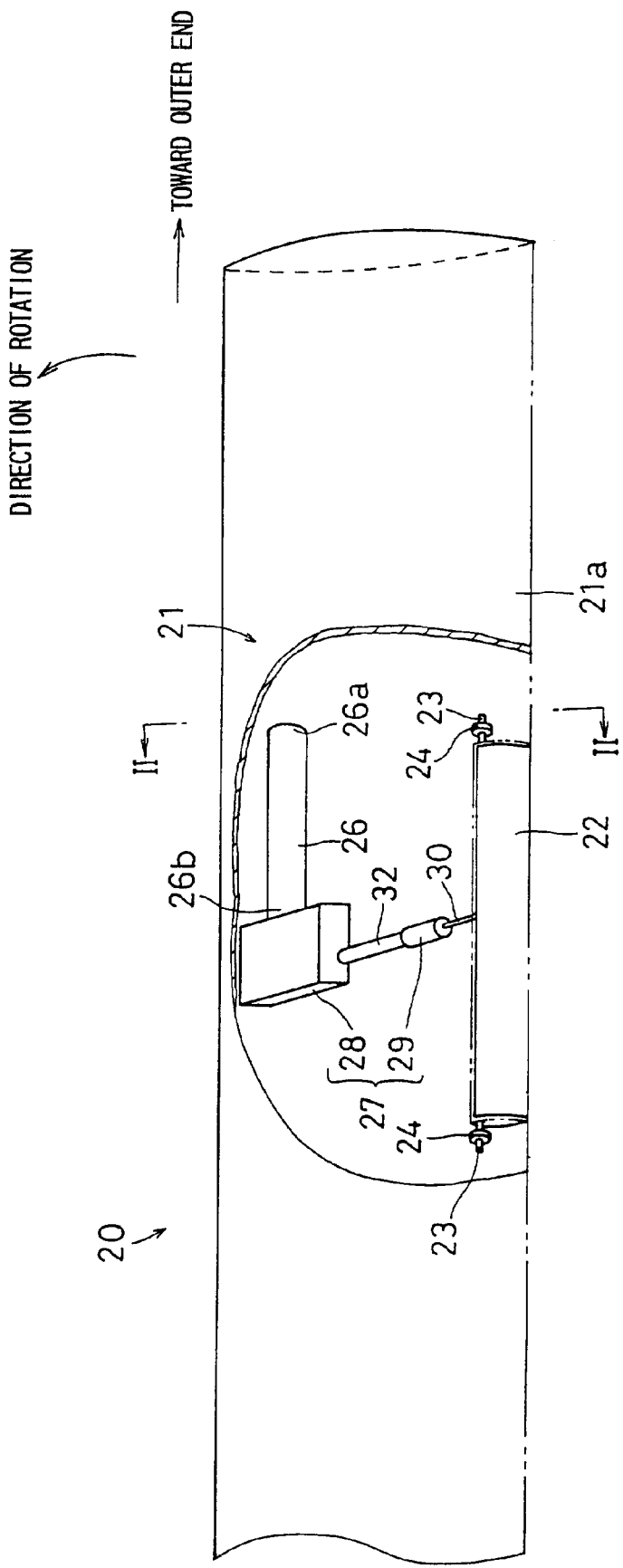
FIG. 1 is a perspective view showing a rotor blade flap driving apparatus 20 according to an embodiment of the invention.

Now referring to the drawings, preferred embodiments of the invention are described below.

Figure 2:
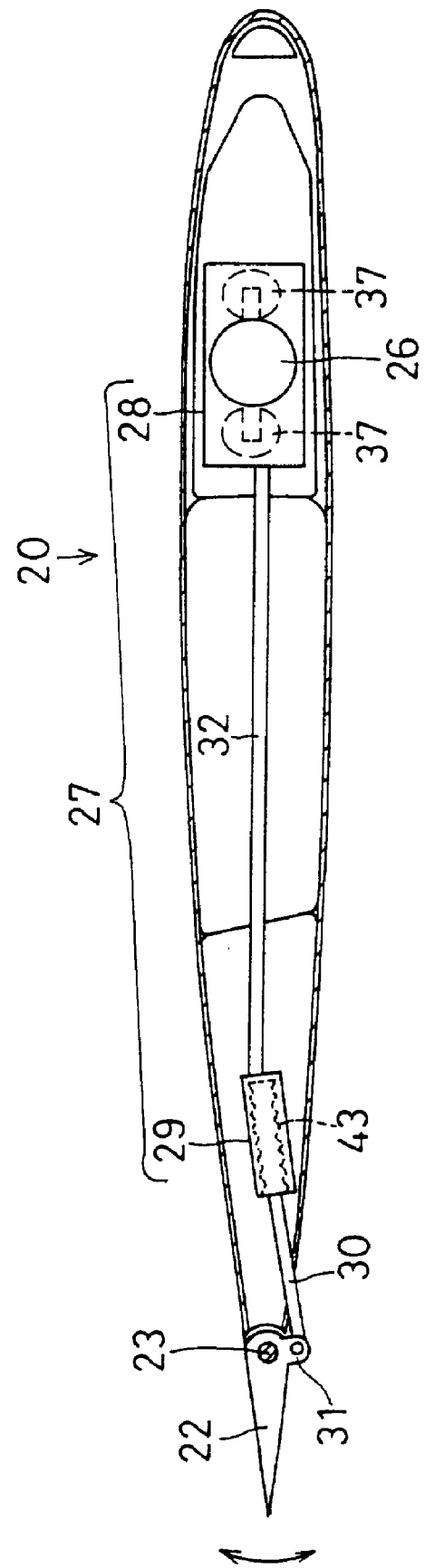
FIG. 2 is a cross-sectional view taken on the line II—II of FIG. 1.

FIG. 1 is a perspective view illustrating a blade 21 so as to be partially cutaway in order to show a rotor blade flap driving apparatus 20 according to an embodiment of the invention. FIG. 2 is a cross-sectional view taken on the line II—II of FIG. 1. The blade 21 of the rotor blade whose outer end is the right side in FIG. 1 rotates in a counterclockwise direction. The rotor blade flap driving apparatus 20 comprises a flap 22, an actuator 26 and displacement magnifying means 27. The flap 22 is attached to a rear edge 21a of the blade 21 by a bearing 24 so as to be angularly displaceable about a hinge shaft 23 extending in the direction of the span of the blade 21.

The actuator 26 is composed of, for example, a stack-type piezo-actuator in which a plurality of thin-plate piezo elements which, when a voltage is applied thereto, instantaneously deform in the direction of the thickness to cause displacement are stacked into a cylindrical shape in the direction of the thickness. The actuator 26 is disposed so that the displacement direction of the actuator 26 is displaced along the span of the blade 21, namely in the longitudinal direction of the actuator 26. One end 26a of the actuator 26 on the outer side of the blade 21 is fixed to the blade 21 so that the displacement with respect to the blade 21 is restrained. The displacement of the other end 26b is not restrained. Consequently, the rotation of the rotor blade provides the actuator 26 with a preload due to the centrifugal force. As a result, the actuator 26 is provided with a preload without the necessity for providing another part such as a spring.

The displacement magnifying means 27 for magnifying the amount of displacement of the actuator 26 has an input device 28, an output device 29 and a line 32 for coupling the devices 28 and 29. The amount of displacement of the actuator provided to the input device 28 is magnified to displace the flap 22 through a flap driving rod 30 provided in the output device 29. The flap 22 has a protrusion 31 which protrudes in the direction of the radius from the hinge shaft 23. To the end of the protrusion 31, one end of the flap driving rod 30 is angularly displaceably coupled by a pin. Consequently, when the flap driving rod 30 is displaced in the horizontal direction of FIG. 2, the flap 22 is angularly displaced in the vertical direction of FIG. 2. A cover for covering the protrusion 31 of the flap 22 may be provided.

Figure 3:
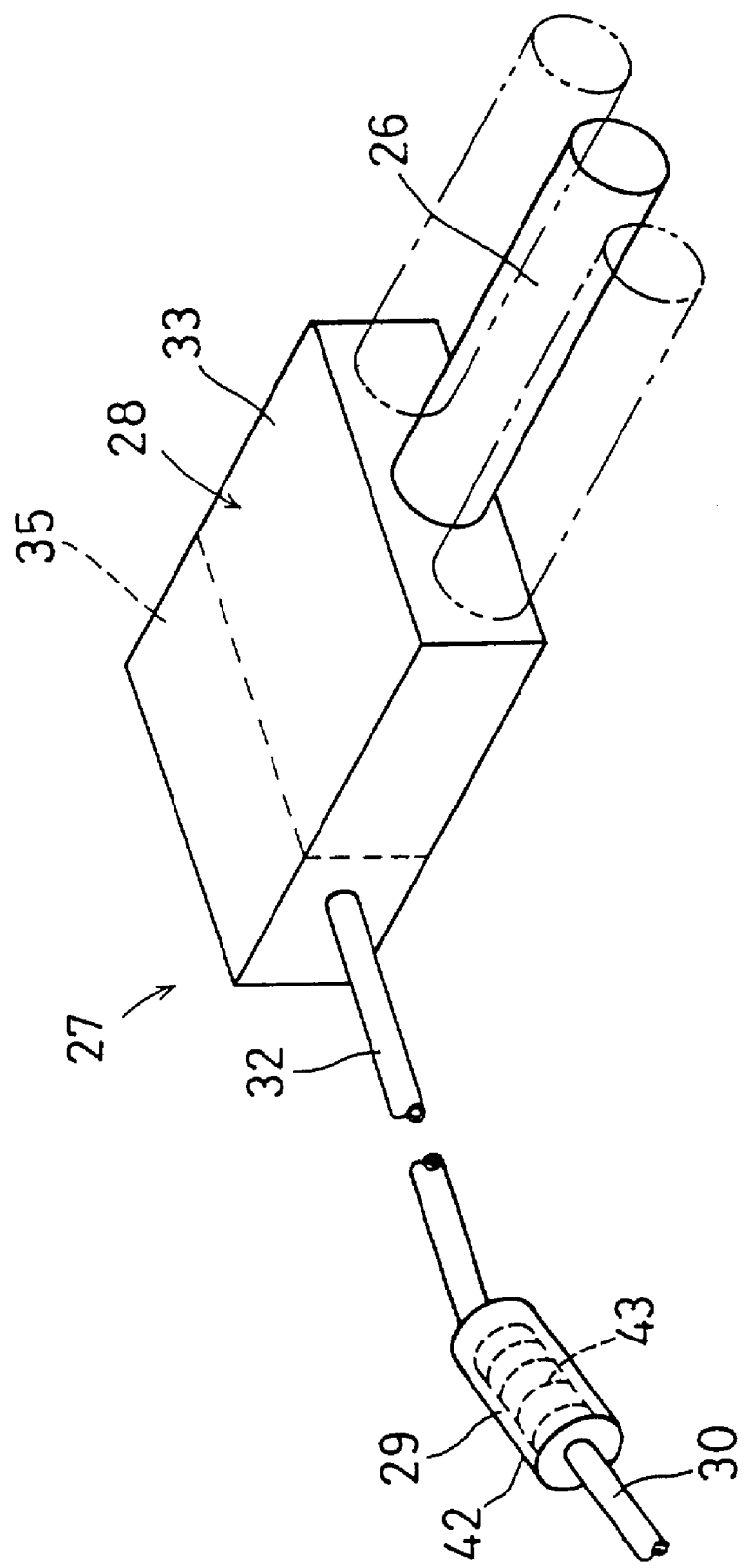
FIG. 3 is a perspective view showing displacement magnifying means 27.
Figure 4:
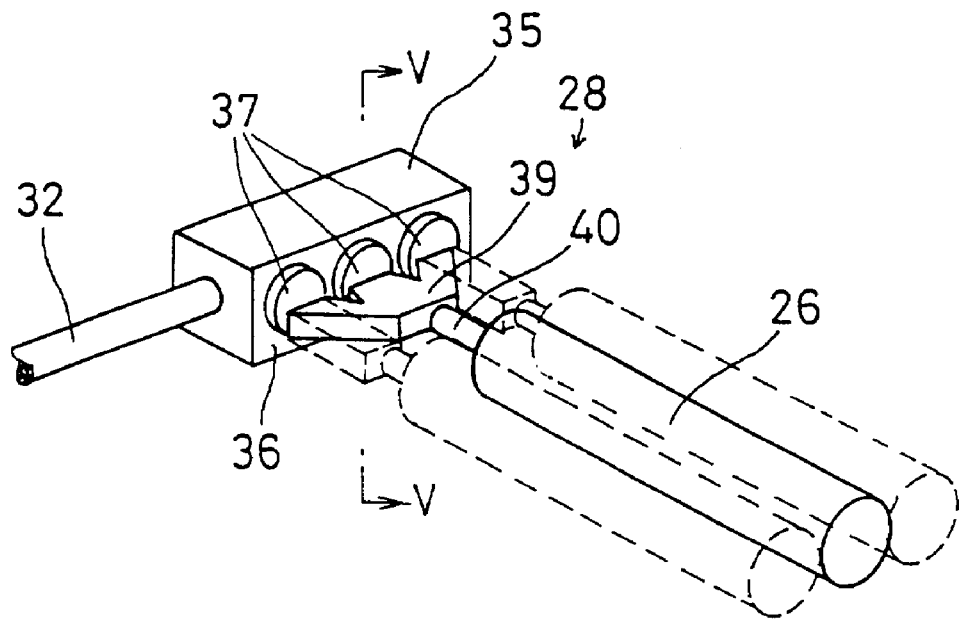
FIG. 4 is a perspective view showing an input device 28 from which a cover 33 has been removed.
Figure 5:
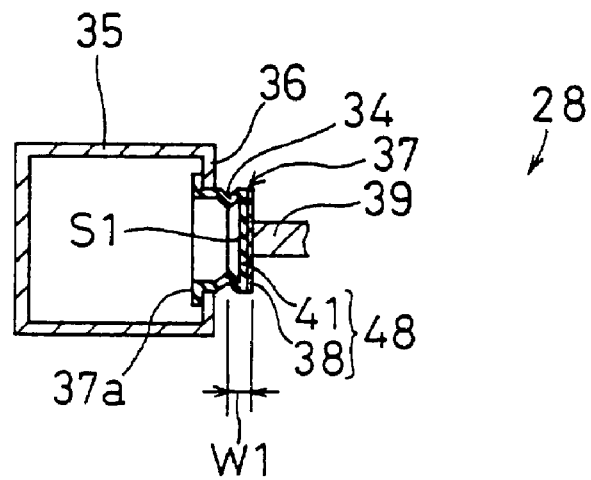
FIG. 5 is a cross-sectional view taken on the line V—V of FIG. 4.
Figure 6:
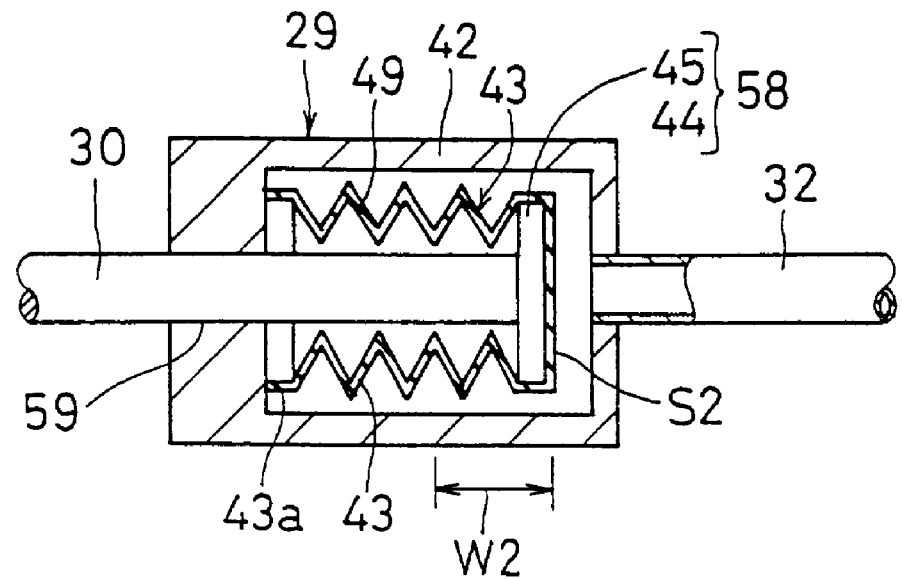
FIG. 6 is a cross-sectional view showing an output device 29.

FIG. 3 is a perspective view showing the displacement magnification means 27. FIG. 4 is a perspective view showing the input device 28 from which a cover 33 has been removed. FIG. 5 is a cross-sectional view taken on the line V—V of FIG. 4. FIG. 6 is a cross-sectional view showing the output device 29. While one actuator 26 is provided in the input device 28 as shown by the solid lines in FIGS. 3 and 4, a plurality of actuators, for example, three actuators disposed in parallel may be provided as shown by the virtual lines in FIGS. 3 and 4 in order to increase the output force and to place the actuators in the thin rotor blades.

The input device 28 has in the cover 33 an input housing 35 filled with a hydraulic fluid. On a side wall 36 of the input housing 35, a plurality of bellows 37, three in this embodiment, are provided. The bellows 37 with a short cylinder shape have a bellows structure with flexibility and elasticity. Peripheries 34 (FIG. 5) thereof are expandable and contractible in the axial direction, that is, in the displacement direction of the actuator 26. The open ends 37a thereof are fixed to the input housing 35 so as to be fluid tight. To a bottom wall 41 of each of the bellows 37, a pressure piece 38 comprising a thin plate having rigidity is bonded from outside. The pressure piece 38 and the bottom wall 41 of the bellows 37 constitute an input portion 48. The periphery 34 functions as an expandable and contractible member. An actuating piece 40 (FIG. 4) provided at an end of the actuator 26 is coupled to a trifurcating operation piece 39. The ends of the operation piece 39 are fixed to the pressure piece 38 of the bellows 37. Consequently, when the actuating piece 40 of the actuator 26 is displaced, the displacement is applied through the operation piece 39 and the input portions 48.

The output device 29 (FIG. 3) has a hollow and substantially cylindrical output housing 42. The output housing 42 and the input housing 35 are coupled by a line 32. The housings 35 and 42 and the line 32 function as a vessel filled with the hydraulic fluid.

A bellows 43 is placed in the output housing 42. The bellows 43 has a substantially cylindrical shape. A periphery 49 (FIG. 6) thereof has a bellows shape so as to be expandable and contractible in the axial direction. An open end 43a of the bellows 43 is fixed to the output housing 42 so as to be fluid tight. In the bellows 43, a pressure piece 45 having rigidity is bonded to a bottom wall 44. The pressure piece 45 and the bottom wall 44 constitute an output portion 58. The output portion 58 is supported so as to be displaceable in the axial direction of the bellows 43. A cavity pressure by air or liquid may be added to the inside in order to maintain the stability of the bellows 43 and to increase the buckling strength. The flap driving rod 30 is fixed to the pressure piece 45. By the through hole 59, the flap driving rod 30 is supported so as to be displaceable in the axial direction.

When the input portion 48 (FIG. 5) of the input device 28 is pushed by the actuator 26, the hydraulic fluid in the input housing 35 is pushed out into the output housing 42 through the line 32. In the output housing 42, the pressure increases due to the hydraulic fluid flowing into the housing 42. The pressure acts on the output portion 58 to contract the bellows 43, so that the flap driving rod 30 is pushed out of the output housing 42.

The surfaces of the bottom walls 41 of the three bellows 37 which surfaces face the hydraulic fluid function as input side pressure surfaces. The surface of the bottom wall 44 of the output portion 58 which faces the hydraulic fluid functions as an output side pressure surface. A stroke length W1 (FIG. 5) of the actuating piece 40 of the actuator 26 is magnified in accordance with the ratio of a total pressure receiving area S1 of the input side pressure surfaces to a pressure receiving area S2 (FIG. 6) of the output side pressure surface and the stroke length W2 of the flap driving rod 30 is W2=(S1/S2)·W1, so that a stroke length W1 which is the input displacement of the actuator 26 is magnified S1/S2 times.

Figure 9:
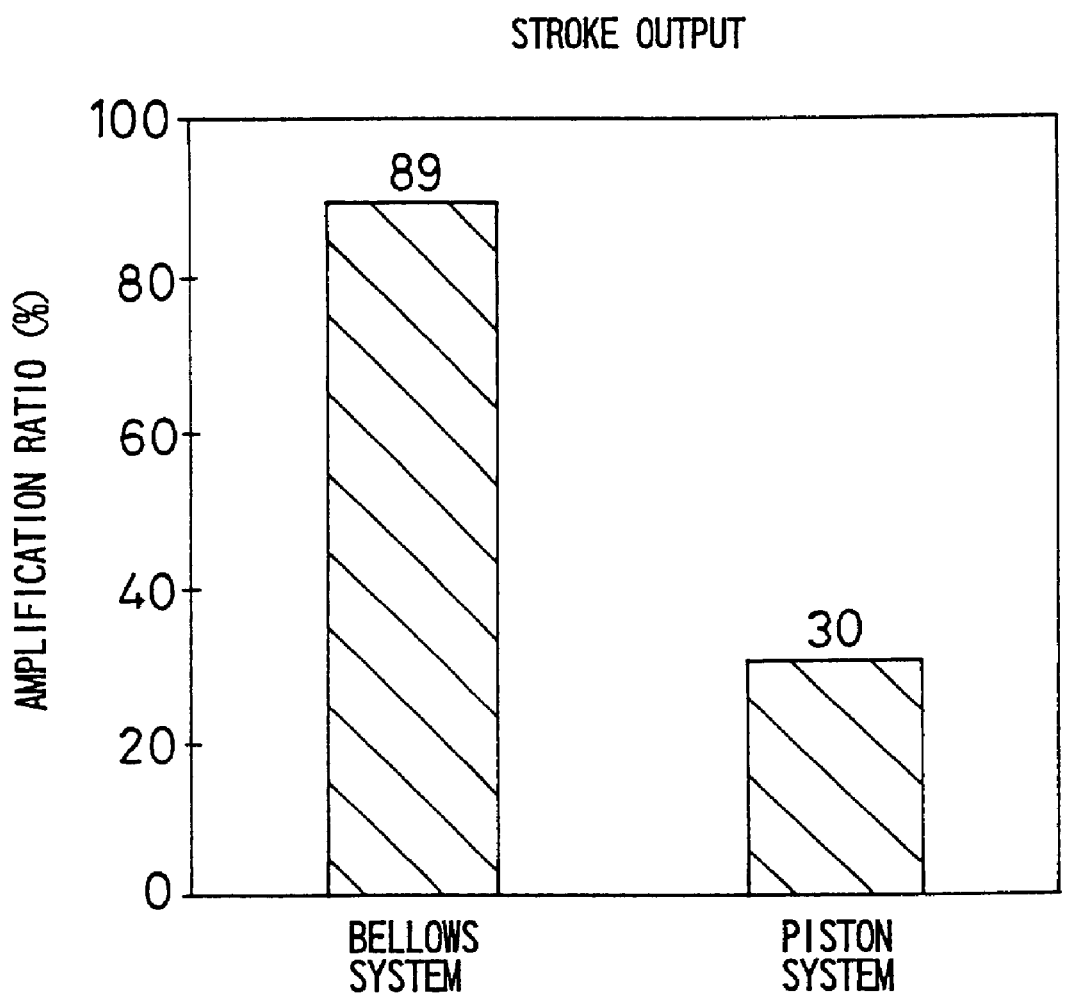
FIG. 9 is a graph showing amplification ratios of the displacement magnifying means of the invention using bellows ("BELLOWS SYSTEM") and of the existing displacement magnifying means using a piston sealed with O ring ("PISTON SYSTEM")

Since the bellows 37 and 43 expand and contract by the bellows-shaped peripheral walls, for example, compared with the O ring which slides on the inner wall of the cylinder, the deterioration of the response characteristic due to friction does not occur even if the input and output portions 48, 58 are displaced at high speed. FIG. 9 compares the amplification ratios of bellows system and piston (O-ring) system. Moreover fluid leakage due to deterioration or wear of the O ring never occurs in bellows system.

When three actuators 26 are used, the actuators can be disposed so as to independently input the displacement to the input portions 48 of the bellows 37 as shown by the virtual lines in FIG. 4.

In this structure, since a plurality of input side bellows 37, three in this embodiment, are provided, even when the space in the blade 21 is limited, by increasing the number of input side bellows 37, the input side pressure receiving area S1 can be increased without the outside diameter of the input portion 48 being increased. Consequently, the magnification ratio can be increased, so that the flap 22 can be largely displaced even when the input amount of displacement of the actuator 26 is very small.

Figure 7:
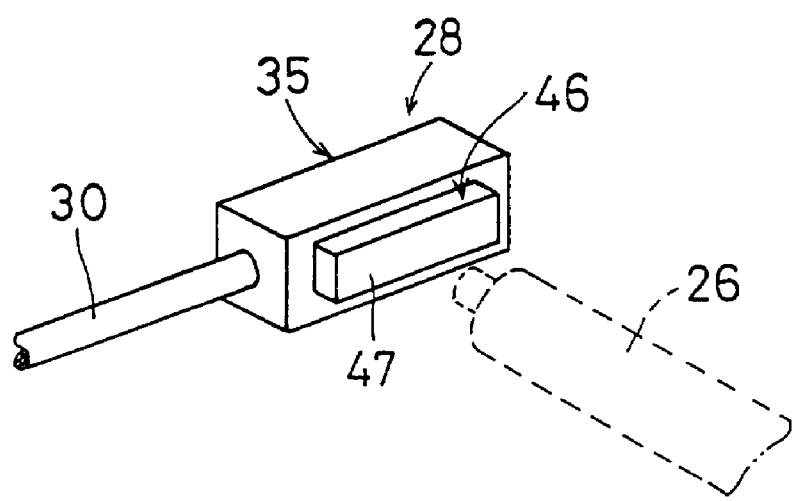
FIG. 7 is a perspective view showing the input device 28 having a rectangular parallelepiped bellows 46.

Instead of the three cylindrical bellows 37 provided at the input device 28, may be used a rectangular parallelepiped bellows 46 with one end open as shown in FIG. 7. The inner surface of the bottom wall of the rectangular parallelepiped bellows 46 which surface faces the hydraulic fluid functions as the input side pressure surface, and a rectangular pressure pieces having rigidity is bonded to the bottom wall to constitute an input portion 47, so that the amount of displacement of the actuator 26 is transmitted to the hydraulic fluid.

The open end of the rectangular parallelepiped bellows 46 is fixed to the input housing 35 so as to be fluid tight and the peripheral wall is expandable and contractible in the displacement direction of the actuator 26.

Figure 8:
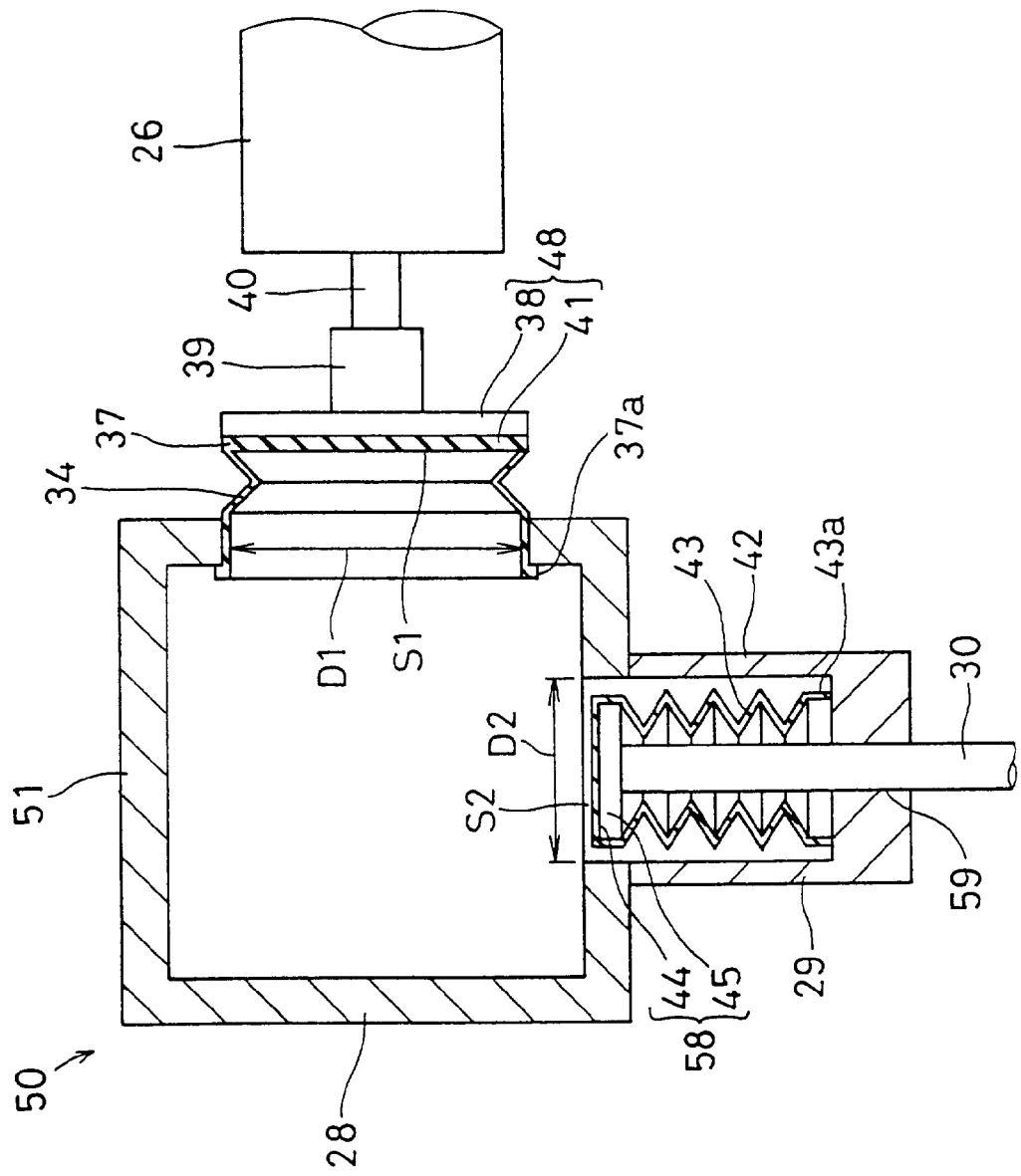
FIG. 8 is a cross-sectional view showing displacement magnifying means 50.

FIG. 8 is a cross-sectional view showing displacement magnifying means 50 provided in a rotor blade flap driving apparatus according to another embodiment of the invention. Structures corresponding to those of the displacement magnifying means 27 shown in FIGS. 1 to 6 are denoted by the same reference designations. In the displacement magnifying means 50, the input and output devices 28, 29 formed as an integral unit. The input device 28 basically comprises an input housing 51 and the expandable and contractible bellows 37 functioning as the input portion 48. An open end 37a of the bellows 37 is fixed to the input housing 51 so as to be fluid tight. The output housing 42 of the output device 29 is connected integrally with the input housing 51. The output device 29 basically comprises the output housing 42 and the expandable and contractible bellows 43 functioning as the output portion 58. The open end 43a of the bellows 43 is fixed to the output housing 42 so as to be fluid tight.

The displacement of the actuator 26 moves the bottom wall 41 of the bellow 37 through the operation piece 39 to apply pressure to the hydraulic fluid. The pressure of the hydraulic fluid acts on the output portion 58 to expand or contract the bellows 43, so that the flap driving rod 30 is displaced.

A diameter D1 of the bellows 37 of the input device 28 is, for example, 70 mm. A diameter D2 of the bellows 43 of the output device 29 is, for example, 20 mm. The ratio of the pressure receiving area S1 of the bellows 37 to the pressure receiving area S2 of the bellows 43 is S1/S2=12.25, so that the input amount of displacement of the actuator 26 is magnified 12.25 times for the flap driving rod 30.

In the structure where the input and output devices 28, 29 are formed as an integral unit, since the line 32 for coupling the input and output devices 28, 29 are unnecessary, the risk of hydraulic fluid leakage can be reduced.

An amplification ratio of the displacement magnifying means of the invention using bellows ("bellows system") is compared with that of the existing displacement magnifying means using a piston sealed with O ring ("piston system") in FIG. 9, in which the values are obtained by converting ratios between pressure receiving areas of the input and output portions into percentages on the assumption that an ideal ratio is represented as 100%.

It can be seen from FIG. 9 that an output obtainable by using the piston is only about one third that obtained by using the bellows. This is because a reduction in amplification ratio due to spring reaction of the bellows is smaller than a reduction in amplification ratio due to friction of the piston.

Figure 10:
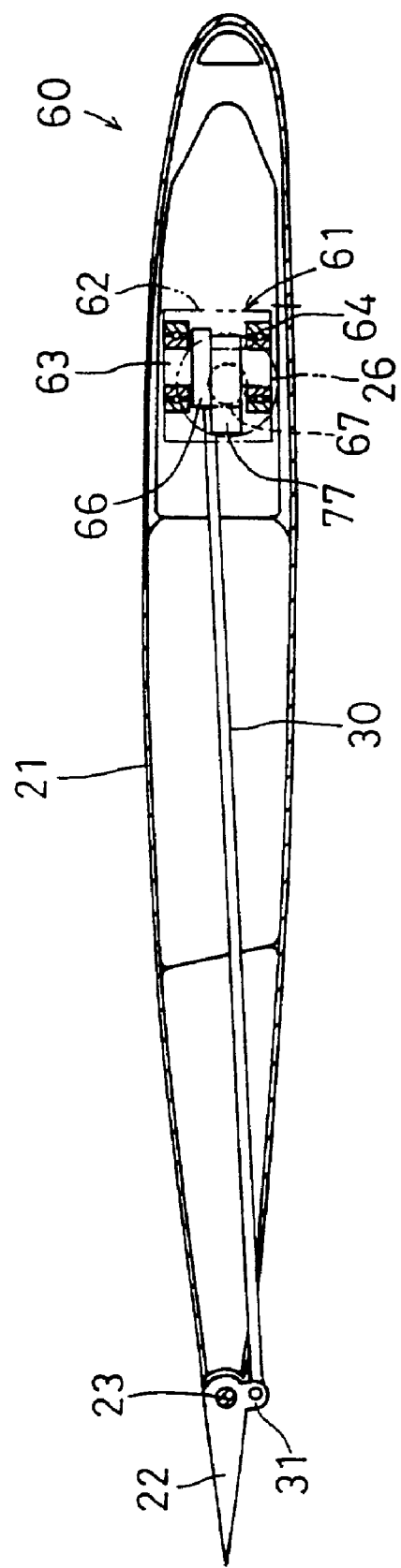
FIG. 10 is a cross-sectional view showing a rotor blade flap driving apparatus 60 according to another embodiment of the invention.
Figure 11:
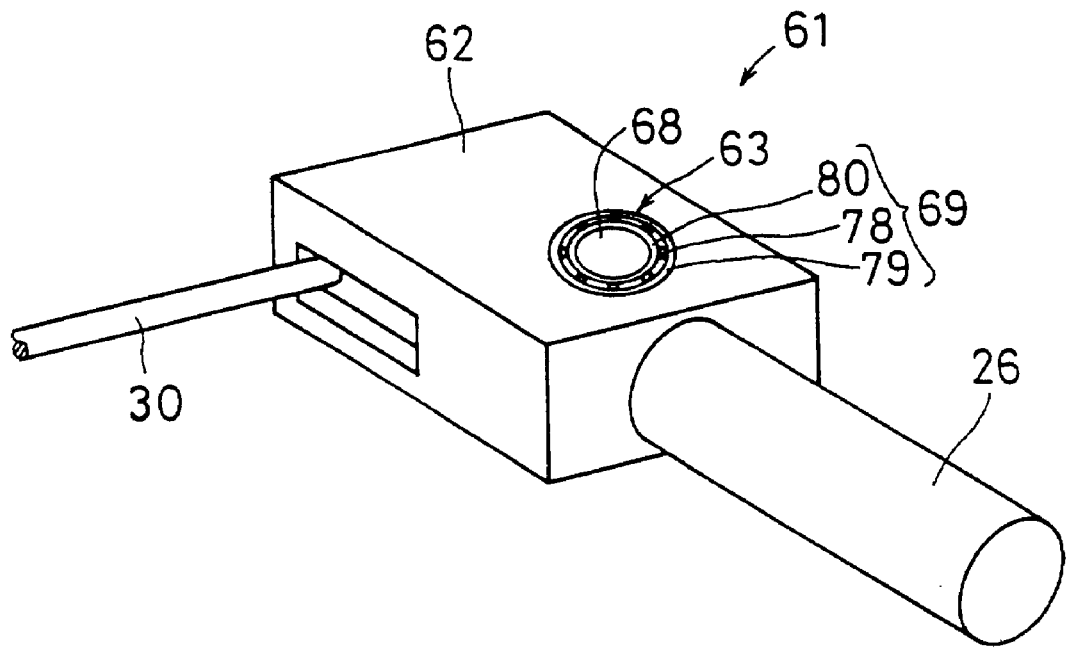
FIG. 11 is a perspective view showing displacement magnifying means 61.

FIG. 10 is a cross-sectional view showing a rotor blade flap driving apparatus 60 according to yet another embodiment of the invention. FIG. 11 is a perspective view showing displacement magnifying means 61 provided in the rotor blade flap driving apparatus 60. Structures corresponding to those of the rotor blade flap driving apparatus 20 shown in FIGS. 1 to 6 are denoted by the same reference designations. Unlike the displacement magnifying means 27 using hydraulic pressure, the displacement magnifying means 61 mechanically magnifies the displacement of the actuator 26.

Like the actuator 26 of the displacement magnifying means 27, the actuator 26 of the displacement magnifying means 61 is composed of a stack-type piezo-actuator or the like. The actuator 26 is disposed so as to be displaced along the span of the blade 21. One end of the actuator 26 on the outer side of the blade 21 is fixed to the blade 21 so that the actuator 26 is provided with a preload by the centrifugal force caused by the rotation of the rotor blade.

Figure 12:
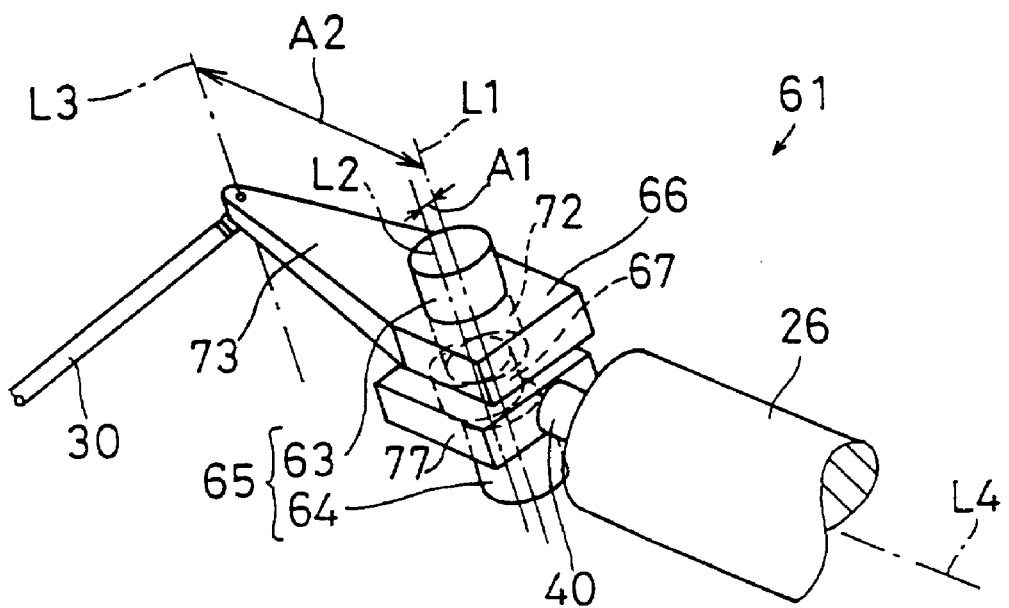
FIG. 12 is a perspective view showing displacement magnifying means 61 from which a housing 62 has been removed.
Figure 13:
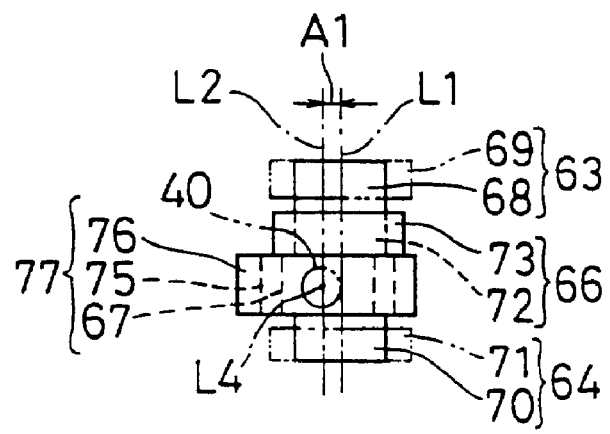
FIG. 13 is a side view of the displacement magnifying means 61.

FIG. 12 is a perspective view of the displacement magnifying mean 61 from which a housing 62 has been removed. FIG. 13 is a side view of FIG. 12. The displacement magnifying means 61 has input and output portions 77, 66 and a support portion 65 which integrally support the input and output portions 77, 66 so as to be angularly displaceable about an angular displacement axis L1. The output portion 66 has an output shaft 72 of a short cylindrical shape whose central axis is the angular displacement axis L1, and an output arm 73 integrally fixed to the output shaft 72 and outwardly extending in the direction of the radius with the angular displacement axis L1 as the center. To the tip of the output arm 73, one end of the flap driving rod 30 is coupled so as to be angularly displaceable about an angular displacement axis L3 which is parallel to the angular displacement axis L1.

The input portion 77 has an input shaft 67. The input shaft 67 has a short cylindrical shape with an axis L2 decentered from the angular displacement axis L1, and integrally fixed to the output shaft 72 of the output portion 66 at a predetermined distance therefrom in the direction of the angular displacement axis L1. To the input axis 67 of the short cylindrical shape, an input block 76 (FIG. 13) is attached through a bearing 75 so as to be angularly displaceable about the axis L2 of the input shaft 67. To the input block 76 of the input portion 77, the actuating piece 40 of the actuator 26 is coupled so that an axis L4 of the actuator 26 intersects at right angles to the axis L2 of the input shaft 67.

The support portion 65 (FIG. 12) comprising an upper support portion 63 and a lower support portion 64 holds the input and output portions 77, 66 from both sides in the direction of the angular displacement axis L1 so as to be angularly displaceable about the displacement axis L1. The upper support portion 63 is integrally fixed to the output shaft 72 from above in FIGS. 12 and 13, and comprises an upper support shaft 68 of a short cylindrical shape whose axial center is the angular displacement axis L1, and a bearing 69. In the bearing 69, as shown in FIG. 11, an outer ring 79 is fixed to the housing 62 and an inner ring 80 is fixed to the upper support shaft 68 so as to be angularly displaced about the angular displacement axis L1 through a rolling member 78. The housing 62 is fixed in the blade 21 so as to restrain the movement toward the inner side of the blade 21.

Likewise, the lower support portion 64 is integrally fixed to the input shaft 67 from below in FIGS. 12 and 13, and has a lower support shaft 70 of a short cylindrical shape whose axial center is the angular displacement axis L1, and a bearing 71 supporting the lower support shaft 70 so as to be angularly displaceable about the angular displacement axis L1. An outer ring of the bearing 71 is fixed to the housing 62. The bearings 75, 69 and 71 each comprises an angular ball bearing and can bear radial loads and thrust loads.

Since the actuator 26 is disposed so that its axis L4 intersects at right angles to the input shaft 67 with respect to a plane including the axis L2 of the input portion 77 and the angular displacement axis L1, the displacement from the actuator 26 is applied to the input shaft 67 through the input block 76 and the bearing 75. Since the axis L2 of the input shaft 67 is set so as to be decentered from the angular displacement axis L1 by A1, the input shaft 67 is angularly displaced about the angular displacement axis L1 by the input displacement from the actuator 26. When the input shaft 67 is angularly displaced, the output shaft 72 and the output arm 73 of the output portion 66 which integrally fixed to the input shaft 67 are rotated largely about the angular displacement axis L1. The input displacement from the actuator 26 is thus magnified and displace the flap driving rod 30 largely.

The distance between the angular displacement axis L1 and the axis L2 of the input shaft 67 is an input arm length A1. The distance between the angular displacement axis L1 and the angular displacement axis L3 at the tip of the output arm 73 is an output arm length A2. The input arm length A1 is, for example, 3.3 mm. The output arm length A2 is, for example, 50 mm. Consequently, the amount of displacement of the actuator 26 is magnified approximately A2/A1≈15 times.

As described above, even when the input arm length A1 is very short, since the input portion 77 and the support portion 65 are disposed so as to be shifted from each other in the vertical direction at a predetermined distance therebetween in the direction of the angular displacement axis L1, the sizes of the bearings 69 and 71 for supporting the support portion 65 and the size of the bearing 75 for supporting the input portion 77 are not limited, so that the support portion 65 and the input portion 77 can be supported with stability and rigidity.

As described above, according to the invention, since the input and output portions 77, 66 can be supported with stability and rigidity even if the input arm length A1 is very small, the input displacement from the actuator 26 can be properly magnified without the output arm length A2 being so increased, that is, the size of structure of the displacement magnifying means 61 can be reduced so as to install within the structure of rotor blade.

Figure 14:
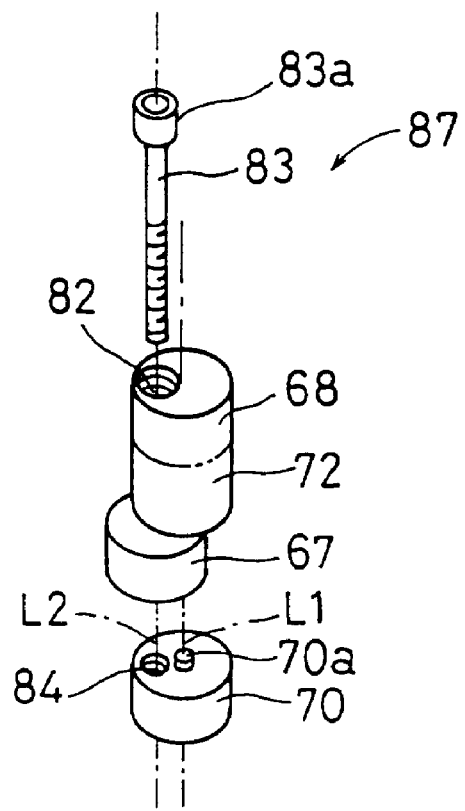
FIG. 14 is an exploded perspective view of an axial portion of an assembly 87.

The displacement magnifying means 61 has an assembly 87 (FIG. 14) comprising the upper support shaft 68, the output shaft 72, the input shaft 67 and the lower support shaft 70. The assembly 87 is formed in the following manner: As shown in FIG. 14, the output shaft 72 of the output portion 66, the upper support shaft 68 of the upper support portion 63 and the input shaft 67 of the input portion 77 are formed as an integral cylindrical unit, and the lower support shaft 70 of the lower support portion 65 is separately formed. Then, a bolt hole 82 is drilled through the upper support shaft 68, the output shaft 72 and the input shaft 67 that are the integral unit, and a screw hole 84 is formed in the lower support shaft 70. A bolt 83 is inserted into the bolt hole 82 and screwed into the screw hole 84 of the lower support shaft 70 to thereby integrate the upper support shaft 68, the output shaft 72, the input shaft 67 and the lower support shaft 70. The bolt hole 82 and the screw hole 84 are preferably aligned along the axis L2 of the input shaft 67 so as to be decentered from the angular displacement axis L1. Since the displacement magnifying means 61 is supported at both of the upper and lower ends so as to be angularly displaceable about the angular displacement axis L1, when the displacement from the actuator 26 is applied to the decentered input shaft 67, the displacement is properly transmitted to the output portion 66 through the bolt 83 inserted along the axis L2 of the input shaft 67. The lower support shaft 70 is provided with a projection 70a for a detent, and the input shaft 67 is provided with a recess into which the projection 70a is fitted.

By thus separately forming the parts and assembling the parts into one unit by the bolt 83, the parts can be assembled after the bearing 75 is separately attached to the input portion 77, so that an easy-to-assemble structure can be realized.

Figure 15:
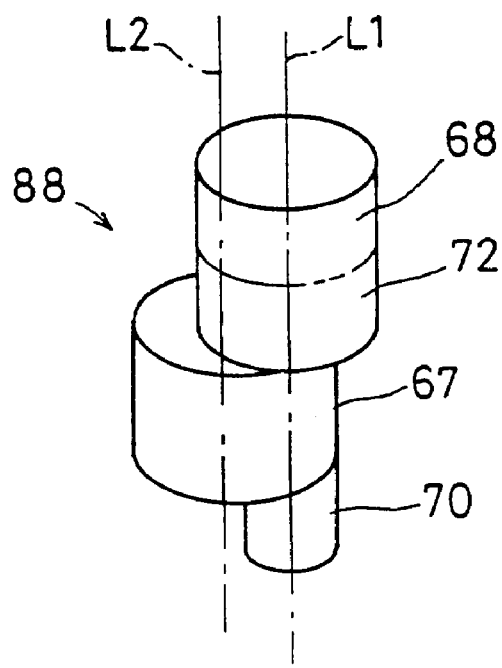
FIG. 15 is a perspective view showing an assembly 88.
Figure 16:
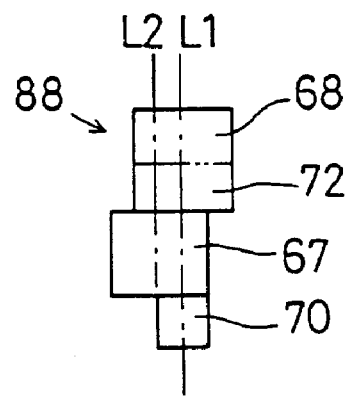
FIG. 16 is a front view of the assembly 88.
Figure 17:
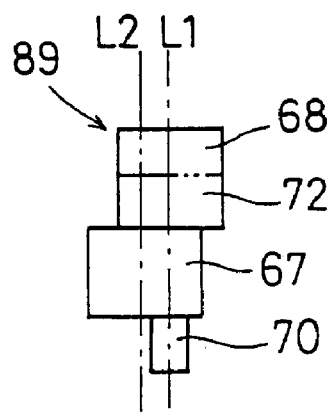
FIG. 17 is a front view of an assembly 89.

FIG. 15 is a perspective view showing another assembly 88. FIG. 16 is a front view of the assembly 88. The assembly 88 comprises the upper support 68, the output shaft 72, the input shaft 67 and the lower support shaft 70 which are formed as an integral unit. In order to insert the bearing 75 of the input shaft 67 from below, the lower support shaft 70 is smaller in diameter than the input shaft 67, and as shown in FIG. 16, the right end of the input shaft 67 and the right end of the lower support shaft 70 are situated at the same distance from the angular displacement axis L1, or like in yet another assembly 89 shown in FIG. 17, the right end of the lower support shaft 70 is situated inside the right end of the input shaft 67. In such assemblies 88 and 89, since all the shafts 68, 72, 67 and 70 are formed as an integral unit, high precision and high rigidity are ensured.

Figure 18:
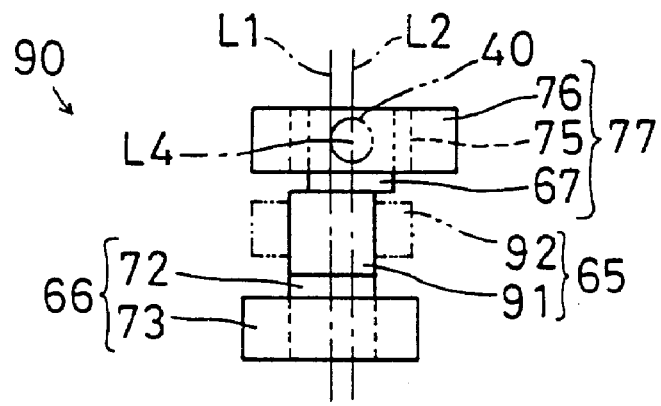
FIG. 18 is a side view showing displacement magnifying means 90.
Figure 19:
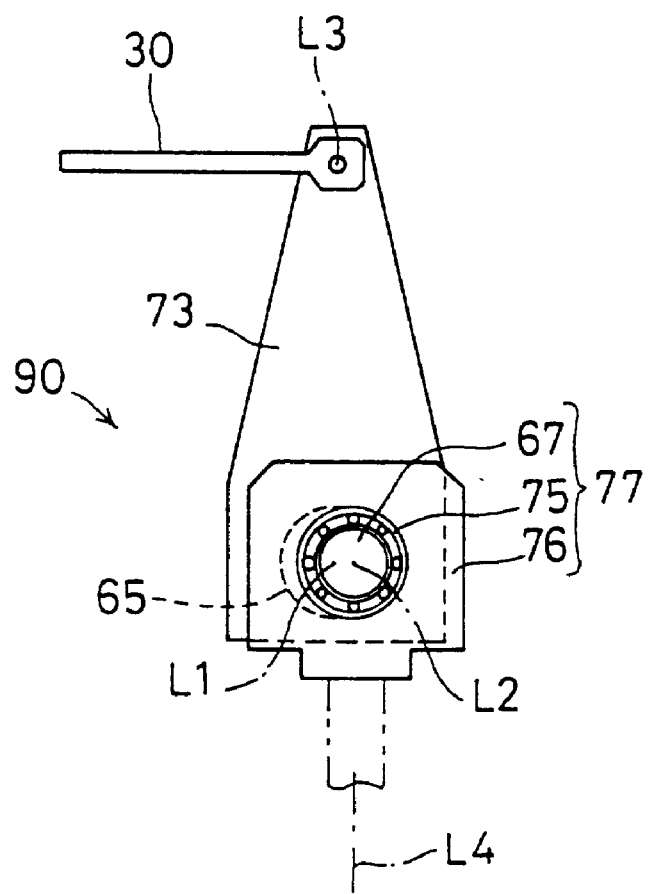
FIG. 19 is a plan view showing the displacement magnifying means 90.

FIG. 18 is a side view showing mechanical displacement magnifying means 90 according to another embodiment of the invention. FIG. 19 is a plan view of the displacement magnifying means 90. Structures corresponding to those of the displacement magnifying means 61 are denoted by the same reference designations and will not be described. While the displacement magnifying means 90 of FIGS. 18 and 19 are similar to the displacement magnifying means 61 of FIGS. 12 and 13, the support portion 65 is disposed in the center in the direction of the angular displacement axis L1.

The input shaft 67 of the input portion 77 having the axis L2 decentered from the angular displacement axis L1 is fixed above a support shaft 91 of the support portion 65, whereas the output shaft 72 of the output portion 66 is fixed below the support shaft 91 coaxially with the angular displacement axis L1. A bearing 92 of the support portion 65 in which the inner ring is fixed to the support shaft 91 and the outer ring is fixed to the housing 62 supports the input and output portions 77, 66 so as to be angularly displaceable about the angular displacement axis L1.

Even when this structure is used, since the support portion 65, and the input and output portions 77, 66 are disposed at a predetermined distance therebetween in the direction of the angular displacement axis L1, space for disposing the bearing 92 is sufficiently provided, so that the input and output portions 77, 66 are supported by the bearing 92 with stability and rigidity. As described above, even when only one bearing 92 is used, since the distances of the input and output portions 77, 66 are very close to the support portion 65, the input and output portions 77, 66 can be angularly displaceably supported with stability and rigidity.

Figure 20:
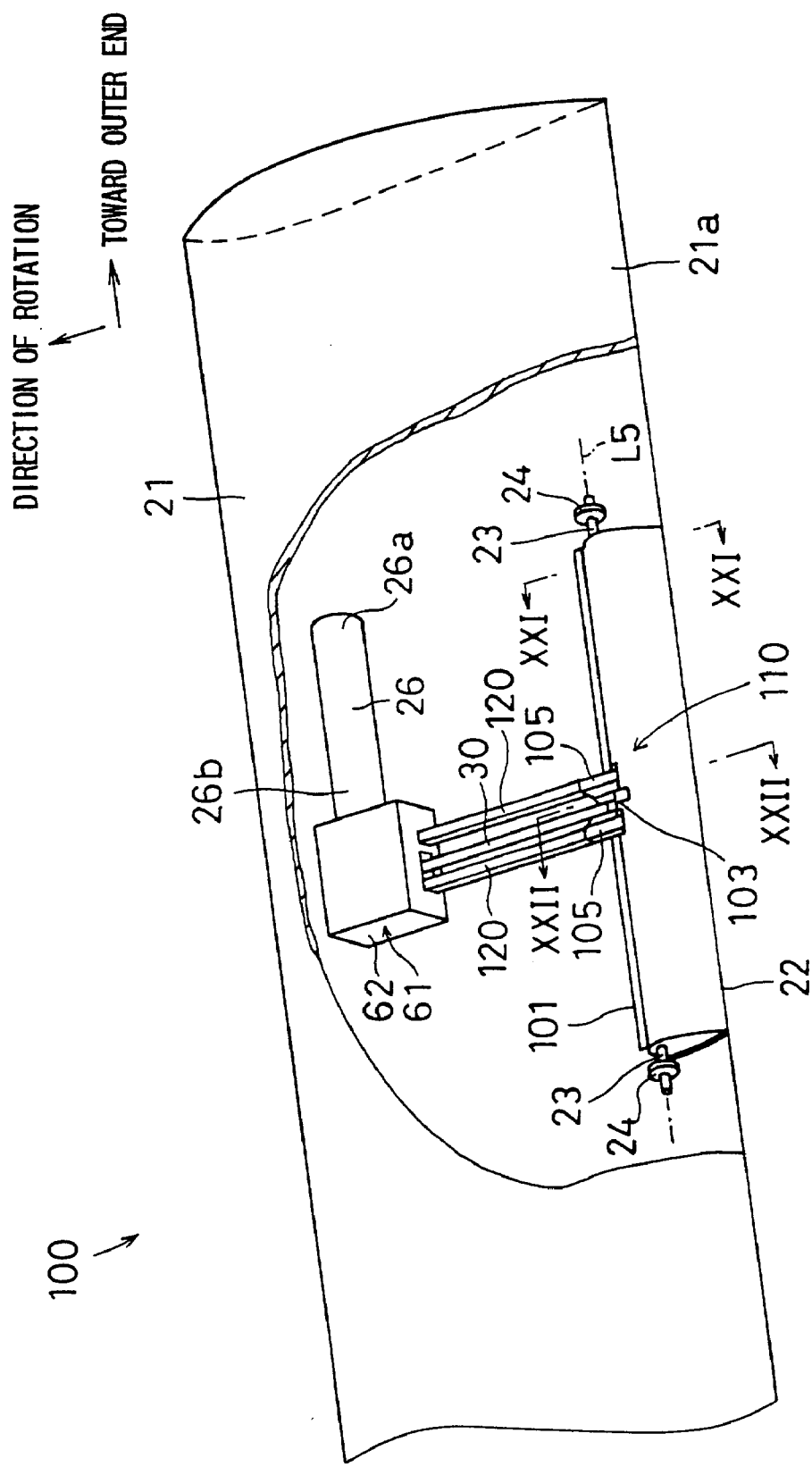
FIG. 20 is a perspective view showing a rotor blade flap driving apparatus 100 according to another embodiment of the invention.
Figure 21:
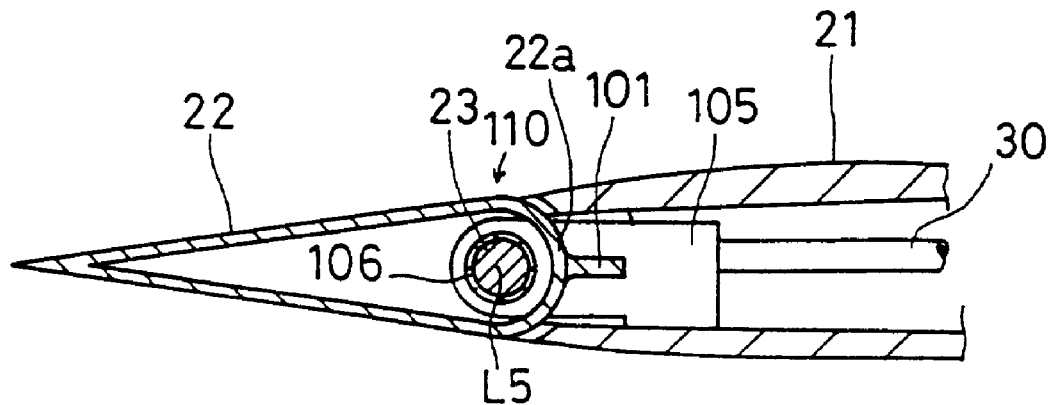
FIG. 21 is a cross-sectional view taken on the line XX—XX of FIG. 20.
Figure 22:
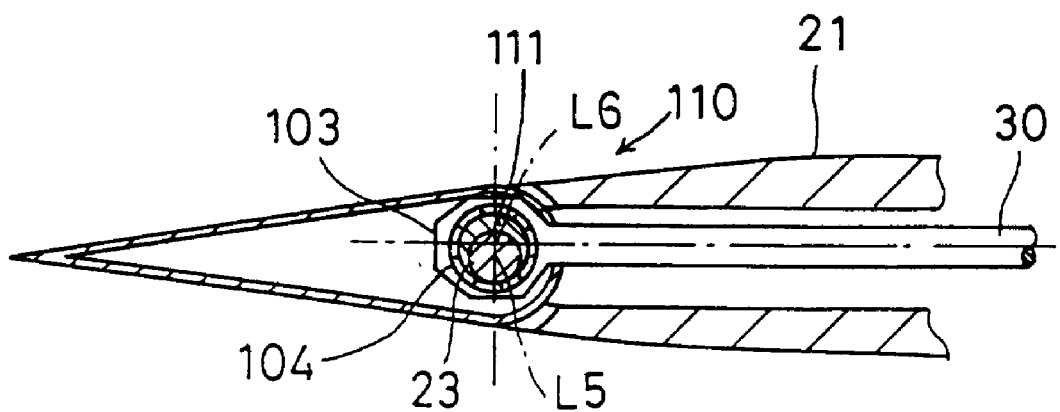
FIG. 22 is a cross-sectional view taken on the line XXI—XXI of FIG. 20.
Figure 23:
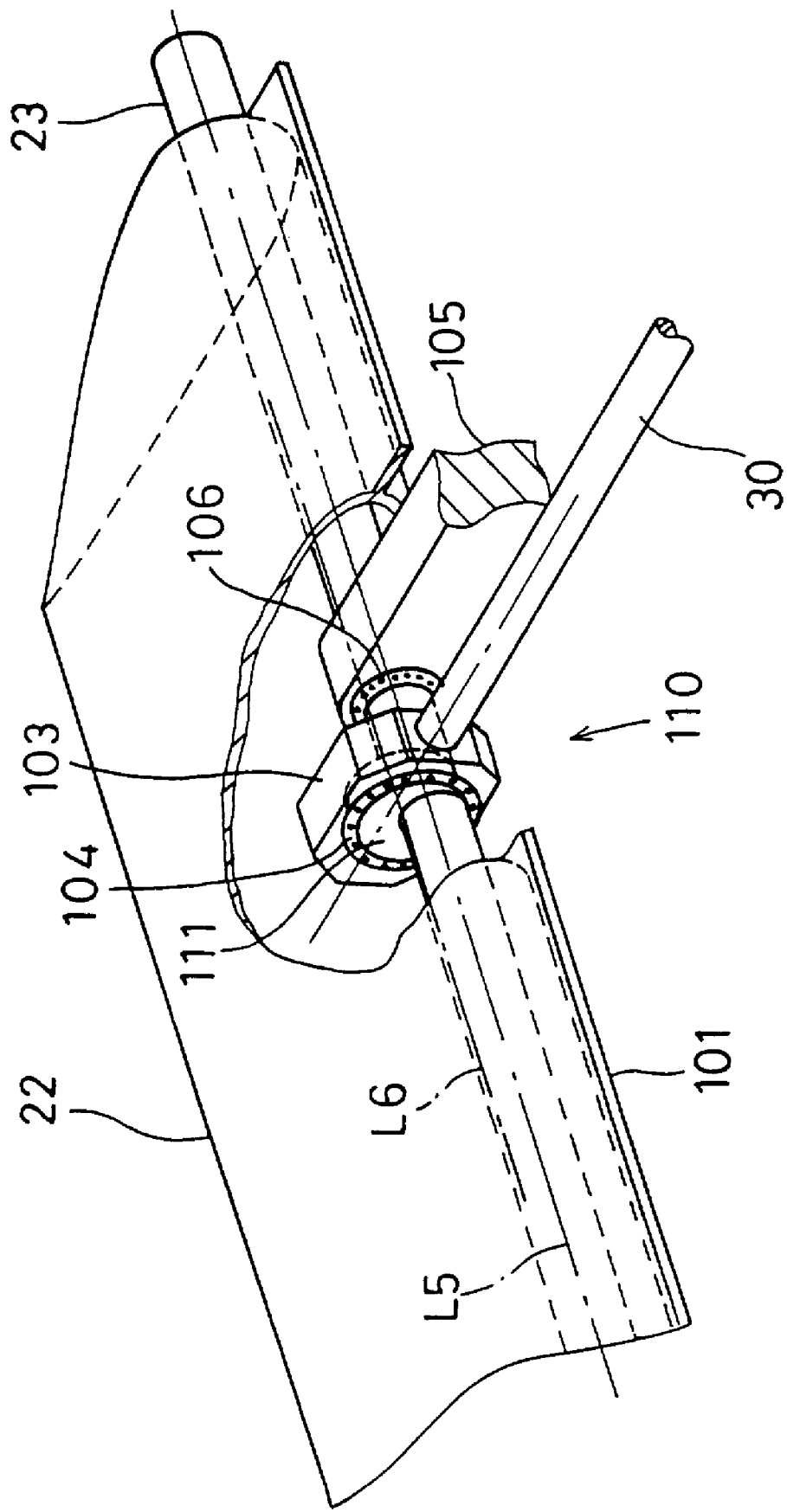
FIG. 23 is a perspective view showing a vicinity of displacement magnifying means 110.
Figure 24:
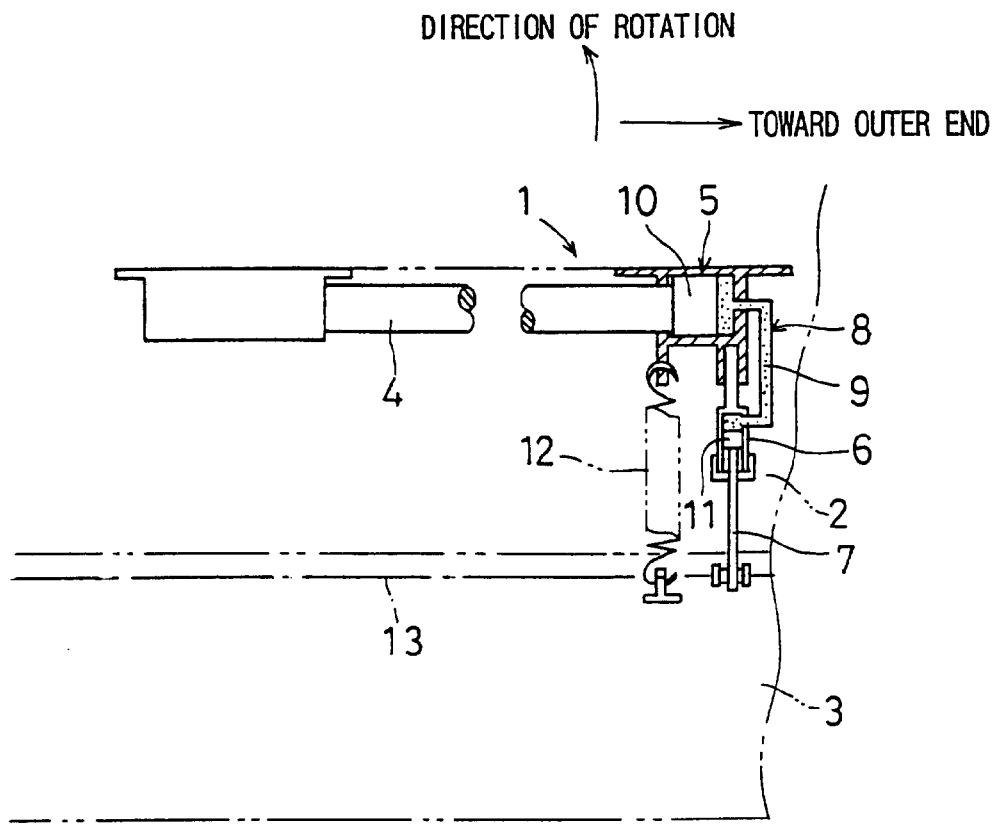
FIG. 24 is a plan view showing the existing rotor blade flap driving apparatus 1.
Figure 25:
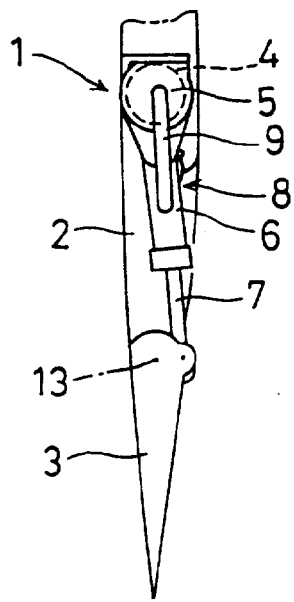
FIG. 25 is a side view showing the existing rotor blade flap driving apparatus 1.

FIG. 20 is a perspective view illustrating the blade 21 which is partially cutaway in order to show a rotor blade flap driving apparatus 100 according to yet another embodiment of the invention. FIG. 21 is a cross-sectional view taken on the line XXI—XXI of FIG. 20. FIG. 22 is a cross-sectional view taken on the line XXII—XXII of FIG. 20. FIG. 23 is a perspective view showing the vicinity of displacement magnifying means 110. Structures corresponding to those of the rotor blade flap driving apparatuses 20 and 60 shown in FIGS. 1 to 19 are denoted by the same reference designations. The first displacement magnifying means 61 directly attached to the actuator may be the displacement magnifying means 27 or 50 using hydraulic pressure as shown in FIGS. 1 to 8 or may be the mechanical displacement magnifying means 61 or 90 as shown in FIGS. 10 to 19.

As shown in FIG. 21, a protruding plate 101 is formed at a leading edge 22a of the flap 22. The plate 101 serves as a mass balance for placing the weight balance in the proximity of or forward of the hinge shaft 23, as an air seal for inhibiting undesirable air flows between the upper and lower surfaces of the blade 21 at the flap leading edge 22a, and as a stopper for inhibiting angular displacement by contacting with the blade 21 when the flap 22 is largely angularly displaced by external force.

In the above-described rotor blade flap driving apparatuses 20 and 60, as shown in FIGS. 2 and 10, the displacement of the flap driving rod 30 obtained from the displacement magnifying means 27 and 61 is transmitted to the protrusion 31 protruding in the direction of the radius with the hinge shaft 23 of the flap 22, so that the flap 22 is angularly displaced.

On the contrary, in this embodiment, the second displacement magnifying means 110 is provided at the hinge shaft 23. The second displacement magnifying means 110 has an input shaft 111, a bearing 104 and a rod end 103. The input shaft 111 is integrally fixed to the hinge shaft 23 of the flap 22 as shown in FIGS. 22 and 23. The input shaft 111 is a large-diameter shaft being larger in diameter than the hinge shaft 23, and has an axis L6 decentered from an angular displacement axis L5 of the flap 22 at a predetermined distance therefrom. The rod end 103 has the bearing 104 supporting the input shaft 111 so as to be angularly displaceable about the axis L6. The flap driving rod 30 is coupled through the rod end 103 so as to intersect at right angles to the axis L6 with respect to a plane including the axis L5 and the axis L6.

In order to prevent the displacement from decreasing due to deflection of the shaft 23, a support member 105 is provided which rotatably supports via a bearing 106 the hinge shaft 23 with one end fixed in the blade 21 and the other end situated in the proximity of the input shaft 111. The support member 105 may be disposed on both sides of the input shaft 111 or may be disposed only on one side of the input shaft 111.

As shown in FIG. 20, it is preferable to install brace members 120 to ensure the rigidity of the support members 105 relative to the flap driving rod 30.

With this structure, the distance between the axis L5 of the hinge shaft 23 and the axis L6 of the input shaft 111 can be small compared with the structure in which the rod end 30 is attached to the protrusion 31 as shown in FIG. 2. Since the distance between the axis L5 and the axis L6 is the input arm length, which can be extremely small, the distance from the axis L6 to the rear edge of the flap 22 is very large with respect to the distance between the axis L5 and the axis L6, so that the magnification ratio of the second displacement magnifying means 110 can be increased.

Since the rod end 103 is placed in the flap 22, no parts protrude outside the blade, so that the flap driving rod is not affected by aerodynamic force and the performance of the blade 21 does not deteriorate.

The actuator 26 is not limited to a stack-type piezo-actuator but may be a giant magnetostrictive actuator or an actuator of another type.

The giant magnetostrictive actuator is displaced by a change in magnetic field caused by passing current through an electromagnetic coil. Even when the giant magnetostrictive actuator is used that is necessarily provided with a preload by compressing the actuator in the displacement direction in order to increase fatigue life, by setting the displacement direction of the giant magnetostrictive actuator in the direction of the span of the blade, fixing one end of the actuator on the outer side of the actuator to the blade and attaching the actuator so that the displacement of the other end of the actuator is not restrained, the giant magnetostrictive actuator is provided with a preload by the centrifugal force caused by the rotation of the rotor blade. As a result, it is unnecessary to use another part such as a spring for providing a preload.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A rotor blade flap driving apparatus comprising:
   a flap angularly displaceably attached to a rear edge of a blade;
   an actuator for generating a driving force of the flap; and
   displacement magnifying means interposed between the actuator and the flap, for magnifying an amount of displacement of the actuator,
   wherein the displacement magnifying means comprises:
      a vessel filled with a hydraulic fluid;
      an input portion to which a displacement from the actuator is transmitted, having an input side pressure surface facing the hydraulic fluid;
      a first expandable and contractible member for displaceably supporting the input portion and sealing a gap between the input portion and the vessel;
      an output portion having an output side pressure surface which faces the hydraulic fluid and have a smaller pressure receiving area than that of the input side pressure surface, the output portion being coupled to the flap; and
      a second expandable and contractible member for displaceably supporting the output portion and sealing a gap between the output portion and the vessel.

2. The rotor blade flap driving apparatus of claim 1, wherein the vessel filled with the hydraulic fluid comprises:
   an input housing having the input portion to which the displacement from the actuator is transmitted;
   an output housing disposed in the proximity of the flap, having the output portion; and
   a line connected to the input housing to the output housing filled with a hydraulic fluid.

3. The rotor blade flap driving apparatus of claim 1, wherein the displacement magnifying means is formed into a unit structure in which the input and output portions are disposed close to each other.

4. The rotor blade flap driving apparatus of claim 1, wherein a plurality of input portions each having the input side pressure surface are disposed in parallel in a direction of a chord of the rotor blade.

5. A rotor blade flap driving apparatus comprising:
   a flap attached to a rear edge of a blade so as to be angularly displaceable;
   an actuator for generating a driving force of the flap; and
   displacement magnifying means interposed between the actuator and the flap, for magnifying an amount of displacement of the actuator, wherein the displacement magnifying means comprises:

an input portion having an axis which is decentered from a predetermined angular displacement axis by a predetermined input arm length, the actuator being coupled to the input portion so as to intersect the decentered axis perpendicularly thereto;

an output portion to which the flap is coupled with an output arm having a length larger than the input arm length with respect to the angular displacement axis; and a support portion for supporting the input and output portions so as to be angularly displaced about the angular displacement axis integrally, the support portion being coupled to the input and output portions at predetermined distances therefrom in a direction of the angular displacement axis.

6. The rotor blade flap driving apparatus of claim 5, wherein the displacement magnifying means comprises the input portion, the output portion and the support portion sharing the angular displacement axis and an input shaft of the input portion, an output shaft of the output portion and a support shaft of the support portion are formed as an integral unit.

7. The rotor blade flap driving apparatus of claim 1, further comprising between the output portion of the displacement magnifying means and an angular displacement shaft of the flap:

an output rod attached to the output portion; and second displacement magnifying means fixed to the angular displacement shaft of the flap, having an axis decentered from an angular displacement axis of the flap by a predetermined input arm length, the output rod being coupled to the second displacement magnifying means so as to intersect the decentered axis perpendicularly.

8. The rotor blade flap driving apparatus of claim 5, further comprising between the output portion of the displacement magnifying means and an angular displacement shaft of the flap:

an output rod attached to the output portion; and second displacement magnifying means fixed to the angular displacement shaft of the flap, having an axis decentered from an angular displacement axis of the flap by a predetermined input arm length, the output rod being coupled to the second displacement magnifying means so as to intersect the decentered axis perpendicularly.

9. The rotor blade flap driving apparatus of claim 7, wherein the second displacement magnifying means comprises:

an input shaft integrally fixed to the angular displacement shaft of the flap, having a decentered axis situated close to the angular displacement axis of the flap;

a rod end coupled to the output rod, for supporting the input shaft so as to be angularly displaceable about the axis of the input shaft; and a support member situated close to the rod end, having a bearing for supporting the angular displacement shaft of the flap.

10. The rotor blade flap driving apparatus of claim 8, wherein the second displacement magnifying means comprises:

an input shaft integrally fixed to the angular displacement shaft of the flap, having a decentered axis situated close to the angular displacement axis of the flap;

a rod end coupled to the output rod, for supporting the input shaft so as to be angularly displaceable about the axis of the input shaft; and a support member situated close to the rod end, having a bearing for supporting the angular displacement shaft of the flap.

11. The rotor blade flap driving apparatus of claim 1, wherein a plurality of actuators are disposed in parallel in a direction of a chord of the rotor blade.

12. The rotor blade flap driving apparatus of claim 5, wherein a plurality of actuators are disposed in parallel in a direction of a chord of the rotor blade.

13. The rotor blade flap driving apparatus of claim 1, wherein the actuator is composed of a stack-type piezo-actuator in which a plurality of piezo elements are stacked which elements are displaced in accordance with an applied voltage, and the actuator is disposed so as to be displaced along a span of the blade, and one end of the actuator on the outer side of the blade is fixed to the blade.

14. The rotor blade flap driving apparatus of claim 5, wherein the actuator is composed of a stack-type piezo-actuator in which a plurality of piezo elements are stacked which elements are displaced in accordance with an applied voltage, and the actuator is disposed so as to be displaced along a span of the blade, and one end of the actuator on the outer side of the blade is fixed to the blade.

15. The rotor blade flap driving apparatus of claim 1, wherein the actuator is composed of a giant magnetostrictive actuator which is displaced by a change in magnetic field caused by passing current through an electromagnetic coil, and the actuator is disposed so as to be displaced along a span of the blade, and one end of the actuator on the outer side of the blade is fixed to the blade.

16. The rotor blade flap driving apparatus of claim 5, wherein the actuator is composed of a giant magnetostrictive actuator which is displaced by a change in magnetic field caused by passing current through an electromagnetic coil, and the actuator is disposed so as to be displaced along a span of the blade, and one end of the actuator on the outer side of the blade is fixed to the blade.

* * * * *